Aug. 23, 1960     C. W. DICKINSON     2,950,061

NONCLOGGING WINDSHIELD SQUIRTER TIP

Filed July 31, 1959

INVENTOR.
CARL W. DICKINSON
BY
HIS ATTORNEYS ature in a United States Patent Office.

2,950,061
Patented Aug. 23, 1960

2,950,061
NONCLOGGING WINDSHIELD SQUIRTER TIP
Carl W. Dickinson, 253 Atlanta Drive, Pittsburgh, Pa.
Filed July 31, 1959, Ser. No. 830,929
3 Claims. (Cl. 239—110)

This invention relates to apparatus for squirting water on windshields of vehicles while they are in motion, whereby to clean them, and more particularly to the nozzles from which the water sprays onto the glass.

Windshield squirters are well known and extensively used. If mud is thrown onto the windshield of an automobile while it is traveling over a highway, pressing of a button will cause a jet of water to issue from a nozzle mounted directly in front of and below the windshield. The water will project up onto the glass and the windshield wipers then will clean the glass. Since the nozzle outlet is directed in an upward direction, it is not unusual for dirt and mud to settle into the orifice and plug the nozzle. Due to the length of the passage through the nozzle and its small diameter, the pressure of the washing water will not open the nozzle. The nozzle then has to be removed and cleaned, which is sometimes quite difficult to do.

It is among the objects of this invention to provide a windshield squirter nozzle, which cannot be clogged by dirt and the like settling into its outlet from the outside, and which includes an anti-clogging member that is actuated by the pressure of water delivered to the nozzle.

In accordance with this invention, a substantially horizontal nozzle has a water inlet in one end and a water outlet orifice in its top. The inlet end of the nozzle is formed for connection to a source of water under pressure in a motor vehicle so that a fine stream of water can be directed against the windshield of the vehicle. Dirt-blocking means inside the nozzle normally closes the inner end of the outlet orifice, but is movable away from it by water entering the nozzle through its inlet to thereby open the orifice. When the water ceases to enter the nozzle, a spring inside the nozzle returns the dirt-blocking means to outlet-closing position. The nozzle also preferably includes a drain hole that likewise is closed at its inner end while the nozzle is not being used.

The preferred embodiment of the invention is illustrated in the accompanying drawings, in which.

Figure 1:
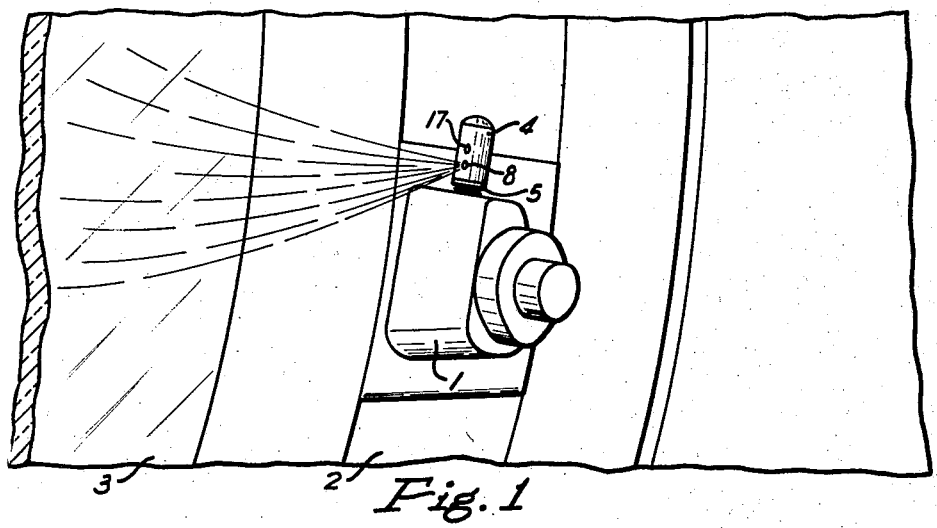
Fig. 1 is a fragmentary plan view of an automobile body showing my windshield squirter tip mounted in operative position.

Referring to Fig. 1 of the drawings, a fitting 1 is shown mounted on the cowl 2 of an automobile below and directly in front of the windshield 3. The fitting, which has a passage through it, may take various forms, its function being to connect a hose (not shown) beneath the cowl with the nozzle of a windshield squirter. As is well known, the hose also is connected with a tank or bag filled with water, which can be put under pressure when desired in order to squirt water up onto the windshield. The nozzle 4 that forms the main body of my squirter tip is cylindrical and hollow and is closed at one end. The side wall of the nozzle is about 1/32 inch thick.

Figure 2:
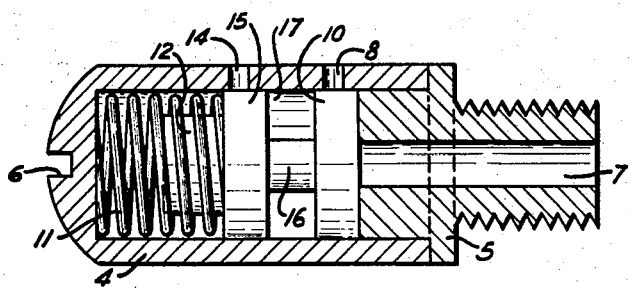
Fig. 2 is a greatly enlarged longitudinal section of the tip.

Pressed into the open end of the nozzle is the inner end of a stem 5, as shown in Fig. 2, the outer end of the stem being threaded so that the tip can be screwed into a hole in the side of fitting 1. A kerf 6 is cut in the opposite end of the nozzle for receiving a screwdriver. The stem is provided with a small longitudinal passage 7 that serves as the water inlet for the nozzle. Close to the inner end of the stem, the side wall of the nozzle is provided near its top with a tiny outlet orifice 8. The tip is adjusted in fitting 1 so that when water under pressure is delivered to the nozzle inlet, the outlet orifice will direct a fine stream upwardly in front of the windshield. The usual windshield wiper then will clean the windshield with this water.

It is a feature of this invention that the nozzle cannot become plugged with dirt entering it through the outlet orifice. Accordingly, displaceable dirt-blocking means is disposed inside the nozzle in a position where it normally closes the inner or lower end of the outlet orifice. Preferably, the dirt-blocking means is a tiny disk-like cylindrical slide, the periphery of which fits snugly against the inner surface of the nozzle. When the slide engages the inner end of the stem, as shown in Fig. 2, it extends past the outlet orifice a short distance. The slide normally is held in this position by means of a coil spring 11 inside the nozzle engaging its closed end. The distance that the slide can move toward the closed end of the nozzle is determined by a stop member 12 moving with the slide. This member is of smaller diameter than the slide and is encircled by the coil spring.

When the operator of the vehicle permits water under pressure to enter the inlet of the nozzle, the water strikes slide 10 and pushes it toward the opposite end of the nozzle until stopped by the stop member. This lateral movement of the slide uncovers the inner end of the outlet orifice so that an open passage is formed through the nozzle to permit it to squirt water onto the windshield. This only happens for a few seconds at a time, and then the water is turned off. The spring then returns the slide to its normal position against stem 5, where it will close the inner end of the outlet orifice again. Any dirt that settles in that orifice cannot enter the nozzle any farther than the inner end of the orifice. This is such a short distance that the moment the water to the nozzle is turned on, it will eject the dirt from the orifice and thereby permit the nozzle to continue to function properly.

Figure 3:
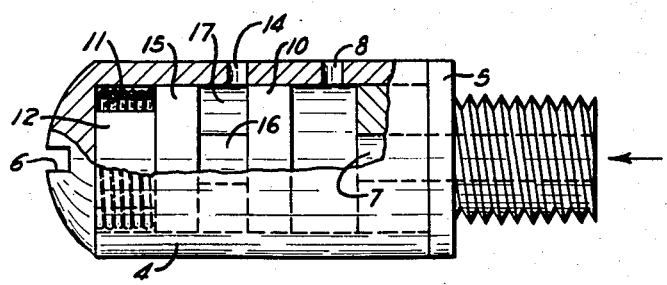
Fig. 3 is a similar view, partly in elevation, showing the movable parts in the positions they occupy while water is being directed by the tip onto a windshield.

In spite of efforts to prevent it, in some cases water may leak past slide 10 and, if not allowed to escape, prevent movement of the slide completely away from orifice-closing position. Therefore, a drain hole 14 is drilled in the side wall of the nozzle behind the position the slide occupies when the spring is fully compressed. The hole can be located anywhere circumferentially of the nozzle, but for convenience of manufacture it may be drilled in the top in line with the outlet orifice. Dirt is prevented from entering the nozzle through this hole and interfering with movements of slide 10 by normally closing the inner end of the hole with a second slide 15 similar to the other one. The two slides are spaced apart by a central spacing member 16 integral with them. The space thus formed between the discs provides a chamber 17, where any water that leaks past slide 10 can accumulate. Since this chamber is in communication with the drain hole at the time such leakage would occur, as shown in Fig. 3, any excess leakage will escape through the hole and not force itself past disc 12 and into the space occupied by the coil spring. If, by any chance, water flows past slide 10 with any force, it will squirt out the drain hole, which is another reason for locating that hole at the top of the nozzle so that water projecting from it will also strike the windshield.

It will be seen that with this improved squirter tip, a great deal of the trouble now experienced with conventional nozzles is avoided. This is a big safety feature, because generally a person does not know that his windshield nozzle is clogged until he pushes the button to operate it, and then it is too late. An accident may result.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A windshield squirter tip adapted to be mounted in front of the windshield of a vehicle for directing a fine stream of water upward against the windshield, said squirter tip comprising a substantially horizontal nozzle having a water inlet in one end and an outlet orifice in its top, a drain hole in the nozzle between its opposite end and said orifice, dirt-blocking slides inside the nozzle engaging its inner surface and normally closing the inner ends of said orifice and hole, means spacing the slides apart, the slides being movable laterally away from said orifice and hole by water entering the nozzle through its inlet to thereby open them and to connect the space between the slides with the drain hole, and a spring inside the nozzle for returning said slides to closing position whenever water ceases to enter the nozzle.

2. A windshield squirter tip adapted to be mounted in front of the windshield of a vehicle for directing a fine stream of water upward against the windshield, said squirter tip comprising a substantially horizontal nozzle having a water inlet in one end and an outlet orifice in its top, a drain hole in the nozzle between its opposite end and said orifice, parallel disks inside the nozzle slidably engaging its inner surface and normally closing the inner ends of the orifice and drain hole, the orifice-closing disk being impervious, a spacing member of smaller diameter than the disks spacing them apart, a stop member secured to the drain hole disk between it and said opposite end of the nozzle to limit movement of the disks toward that end, the disks being movable laterally away from said orifice and hole by water entering the nozzle through its inlet to thereby open them, and a coil spring encircling said stop member and compressed between the drain hole disk and the adjacent end of the nozzle for returning the disks to closing position whenever water ceases to enter the nozzle.

3. A windshield squirter tip adapted to be mounted in front of the windshield of a vehicle for directing a fine stream of water upward against the windshield, said squirter tip comprising a substantially horizontal nozzle having a water inlet in one end and an outlet orifice in its top, a dirt-blocking impervious slide inside the nozzle engaging its inner surface and normally closing the inner end of said orifice, the nozzle being provided with a drain hole at the side of the slide remote from said inlet, a blocking member normally closing the drain hole, said slide being movable laterally away from said orifice by water entering the nozzle through its inlet, means connecting said member with the slide for movement therewith to open the drain hole, a stop member in the nozzle for stopping said laterally moving slide in a position between said orifice and drain hole to thereby open them, and a spring inside the nozzle for returning the slide and said blocking member to their normal positions whenever water ceases to enter the nozzle inlet.

References Cited in the file of this patent

UNITED STATES PATENTS

| | | |
|---|---|---|
| 891,285 | Nethery | June 23, 1908 |
| 917,639 | Mueller | Apr. 16, 1909 |
| 2,613,992 | Bahnson | Oct. 14, 1952 |
| 2,621,976 | Sliepcevich | Dec. 16, 1952 |